(12) United States Patent
Liao et al.

(10) Patent No.: US 10,962,871 B2
(45) Date of Patent: Mar. 30, 2021

(54) LIGHT SOURCE MODULE AND PROJECTION APPARATUS

(71) Applicant: Coretronic Corporation, Hsin-Chu (TW)

(72) Inventors: Chien-Chung Liao, Hsin-Chu (TW); Hsuan-I Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/656,543

(22) Filed: Oct. 17, 2019

(65) Prior Publication Data

US 2020/0050093 A1    Feb. 13, 2020

Related U.S. Application Data

(63) Continuation-in-part of application No. 15/806,316, filed on Nov. 7, 2017, now Pat. No. 10,488,744, and a continuation-in-part of application No. 15/863,999, filed on Jan. 8, 2018, now Pat. No. 10,732,495, which is a continuation-in-part of application No.
(Continued)

(30) Foreign Application Priority Data

May 2, 2014 (TW) .................................. 103115820
Nov. 10, 2016 (CN) .......................... 201610988101.3
Sep. 26, 2017 (CN) .......................... 201710879277.X

(51) Int. Cl.
    *G03B 21/20* (2006.01)
(52) U.S. Cl.
    CPC ....... *G03B 21/204* (2013.01); *G03B 21/2013* (2013.01)

(58) Field of Classification Search
    CPC ....................... G03B 21/204; G03B 21/2013
    See application file for complete search history.

(56) References Cited

U.S. PATENT DOCUMENTS

2013/0162172 A1    6/2013 Baaijens et al.
2013/0258639 A1*  10/2013 Hu ........................... F21V 9/30
                                                           362/84
2018/0173087 A1    6/2018 Hsieh et al.

FOREIGN PATENT DOCUMENTS

| CN | 1784622   | 6/2006 |
| CN | 204302653 | 4/2015 |
| CN | 104793345 | 7/2015 |

(Continued)

*Primary Examiner* — Michelle M Iacoletti
*Assistant Examiner* — Danell L Owens
(74) *Attorney, Agent, or Firm* — JCIPRNET

(57) ABSTRACT

A light source module and a projection apparatus are provided. The light source module includes a blue light source, a red light source, a wavelength conversion wheel and a filter wheel. The blue light source provides a blue light beam. The red light source provides a red light beam. The wavelength conversion wheel is disposed on a transmission path of the blue light beam and has a wavelength conversion region. The blue light beam is converted into a green light beam by the wavelength conversion region. The filter wheel is disposed on transmission paths of the blue light beam and the red light beam. The filter wheel includes a filter region and a diffusion region. A filter spectrum of the filter region includes a first bandwidth and a second bandwidth. The first bandwidth and the second bandwidth are separated with each other.

22 Claims, 9 Drawing Sheets

Related U.S. Application Data

14/527,775, filed on Oct. 30, 2014, now Pat. No. 9,897,907.

(56) References Cited

FOREIGN PATENT DOCUMENTS

| | | |
|---|---|---|
| CN | 204595411 | 8/2015 |
| CN | 105022214 | 11/2015 |
| CN | 104020633 | 12/2015 |
| CN | 105759549 | 7/2016 |
| TW | 201542966 | 11/2015 |
| WO | 2014073136 | 5/2014 |

* cited by examiner

LIGHT SOURCE MODULE AND PROJECTION APPARATUS

CROSS-REFERENCE TO RELATED APPLICATION

This application is a continuation-in-part application of and claims the priority benefit of a prior application Ser. No. 15/806,316, filed on Nov. 7, 2017, now allowed. The prior application Ser. No. 15/806,316 claims the priority benefit of China application serial no. 201610988101.3, filed on Nov. 10, 2016. This application is also a continuation-in-part application of and claims the priority benefit of a prior application Ser. No. 15/863,999, filed on Jan. 8, 2018. The prior application Ser. No. 15/863,999 claims the priority benefit of China application serial no. 201710879277.X, filed on Sep. 26, 2017. The prior application Ser. No. 15/863,999 is a continuation-in-part application of and claims the priority benefit of a prior application Ser. No. 14/527,775, filed on Oct. 30, 2014, which claims the priority benefit of Taiwan application serial no. 103115820, filed on May 2, 2014. The entirety of each of the above-mentioned patent applications is hereby incorporated by reference herein and made a part of this specification.

BACKGROUND OF THE INVENTION

Field of the Invention

The invention relates to an optical module and an optical apparatus, and particularly relates to a light source module and a projection apparatus.

Description of Related Art

Currently, the demands for color performance of the projection apparatuses have become much higher. The apparatuses with a broader color gamut are more favorable to the consumers. To provide a broader color gamut, a projection apparatus may adopt two or more light sources in different colors to provide light beams in different colors. For example, a red solid-state light source is added to a projection apparatus originally adopting only a blue solid-state light source, so as to provide a red light beam. Since the color of the red light beam is rather pure, a broader color gamut is enabled. In such projection apparatus, a blue light beam is provided to excite the green color on a phosphor wheel or a yellow phosphorous powder to generate a green or yellow light beam. The green light beam passes through a green filter on a filter wheel to generate a green light beam meeting demands. A part of the yellow light beam passes through a red filter to form red light, and another part of the yellow light beam passes through a transparent region on a filter wheel to form a yellow light beam. The rest of the blue light beam passes through a hollow part of the phosphor wheel and then passes through the transparent region on the filter region. To enhance the performance of the red color, the red solid-state light source is added to a light path to facilitate rendering of the red color. However, the conventional process of exciting a spectrum by a phosphorous powder and obtaining a green light beam by filtering with a filter wheel may result in loss of optical energy.

The information disclosed in this "Description of Related Art" section is only for enhancement of understanding of the background of the invention and therefore it may contain information that does not form the prior art that is already known to a person of ordinary skill in the art. Furthermore, the information disclosed in this "Description of Related Art" section does not mean that one or more problems to be resolved by one or more embodiments of the invention were acknowledged by a person of ordinary skill in the art.

SUMMARY OF THE INVENTION

The invention provides a light source module and a projection apparatus having a broader color gamut and capable of reducing a loss of energy.

Other objects and advantages of the invention can be further illustrated by the technical features broadly embodied and described as follows.

In order to achieve one or a portion of or all of the objects or other objects, an embodiment of the invention provides a light source module configured to provide an illumination beam. The light source module includes a blue light source, a red light source, a wavelength conversion wheel, and a filter wheel. The blue light source is configured to provide a blue light beam. The red light source is configured to provide a red light beam. The wavelength conversion wheel is disposed on a transmission path of the blue light beam and has a first wavelength conversion region. The first wavelength conversion region is rotated onto the transmission path of the blue light beam. The blue light beam is converted by the first wavelength conversion region to generate a green light beam. The filter wheel is disposed on transmission paths of the blue light beam and the red light beam. The filter wheel includes a first filter region and a diffusion region. A filter spectrum of the first filter region includes a first bandwidth allowing the green light beam to pass through and a second bandwidth allowing the red light beam to pass through. The first bandwidth and the second bandwidth are separated from each other. The blue light beam passes through the diffusion region.

In order to achieve one or a portion of or all of the objects or other objects, an embodiment of the invention provides a projection apparatus including a light source module, an imaging element, and a projection lens. The light source is configured to provide an illumination beam. The light source module includes a blue light source, a red light source, a wavelength conversion wheel, and a filter wheel. The blue light source is configured to provide a blue light beam. The red light source is configured to provide a red light beam. The wavelength conversion wheel is disposed on a transmission path of the blue light beam. The wavelength conversion wheel has a first wavelength conversion region. The first wavelength conversion region is rotated onto the transmission path of the blue light beam. The blue light beam is converted by the first wavelength conversion region to generate a green light beam. The filter wheel is disposed on transmission paths of the blue light beam and the red light beam. The filter wheel includes a first filter region and a diffusion region. A filter spectrum of the first filter region includes a first bandwidth allowing the green light beam to pass through and a second bandwidth allowing the red light beam to pass through. The first bandwidth and the second bandwidth are separated from each other. The light source module provides an illumination beam based on the blue light source, the red light source, the wavelength conversion wheel, and the filter wheel. The light source module is configured to have at least one mode. The blue light source is turned on to provide the blue light beam so as to generate the green light beam by the first wavelength conversion region during the at least one mode. The red light source is turned on to provide the red light beam during the at least one mode. The first filter region is configured so that the green light beam and the red light beam passes through the first filter region at the same time during the at least one mode. The imaging element is disposed on a transmission path of the illumination beam and configured to convert the illumination beam into an image beam. The projection lens is disposed on the transmission path of the image beam and configured to project the image beam to a projection target.

In order to achieve one or a portion of or all of the objects or other objects, an embodiment of the invention provides a light source module configured to provide an illumination beam. The light source module comprises: a blue light source, a red light source, a wavelength conversion wheel, and a filter wheel. The blue light source is configured to provide a blue light beam. The red light source is configured to provide a red light beam. The wavelength conversion wheel is disposed on a transmission path of the blue light beam. The wavelength conversion wheel has a first wavelength conversion region. The first wavelength conversion region is rotated onto the transmission path of the blue light beam. The blue light beam is converted by the wavelength conversion region to generate a green light beam. The filter wheel is disposed on transmission paths of the blue light beam and the red light beam. The filter wheel comprises a first filter region and a diffusion region. A filter spectrum of the first filter region covers a first bandwidth and a second bandwidth. The first bandwidth and the second bandwidth are separated from each other. The first filter region is configured so that the green light beam passes through the filter region when the first filter region is at the path of the green light beam and the red light beam passes through the first filter region when the first filter region is at the path of the red light beam and the blue light beam passes through the diffusion region. The filter wheel is configured to output the red light beam when the red light source is turned on and the blue light source is turned off.

In order to achieve one or a portion of or all of the objects or other objects, an embodiment of the invention provides a projection apparatus. A projection apparatus comprising: a light source module, an imaging element, and a projection lens. The light source is configured to provide an illumination beam. The light source module comprises: a blue light source, a red light source, a wavelength conversion wheel and a filter wheel. The blue light source is configured to provide a blue light beam. The red light source is configured to provide a red light beam. The wavelength conversion wheel is disposed on a transmission path of the blue light beam. The wavelength conversion wheel has a first wavelength conversion region. The first wavelength conversion region is rotated onto the transmission path of the blue light beam. The blue light beam is converted by the first wavelength conversion region to generate a green light beam. The filter wheel is disposed on transmission paths of the blue light beam and the red light beam. The filter wheel comprises a first filter region and a diffusion region. A filter spectrum of the first filter region covers a first bandwidth and a second bandwidth. The first bandwidth and the second bandwidth are separated from each other. The first filter region is configured so that the green light beam passes through the filter region when the first filter region is at the path of the green light beam and the red light beam passes through the first filter region when the first filter region is at the path of the red light beam. The light source module provides an illumination beam based on the blue light source, the red light source, the wavelength conversion wheel, and the filter wheel. The filter wheel is configured to output the red light beam when the red light source is turned on and the blue light source is turned off. The imaging element is disposed on a transmission path of the illumination beam. The imaging element is configured to convert the illumination beam into an image beam. The projection lens is disposed on the transmission path of the image beam. The projection lens is configured to project the image beam to a projection target.

Based on the above, the embodiments of the invention have at least the following advantages effects. In the exemplary embodiments of the invention, the light source module includes the red light source. In addition, the filter spectrum of the first filter region includes the first bandwidth for the green light beam to pass through and the second bandwidth for the red light beam to pass through. Therefore, the light source module and the projection apparatus with the light source module have a broad color gamut and are able to reduce loss of energy.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
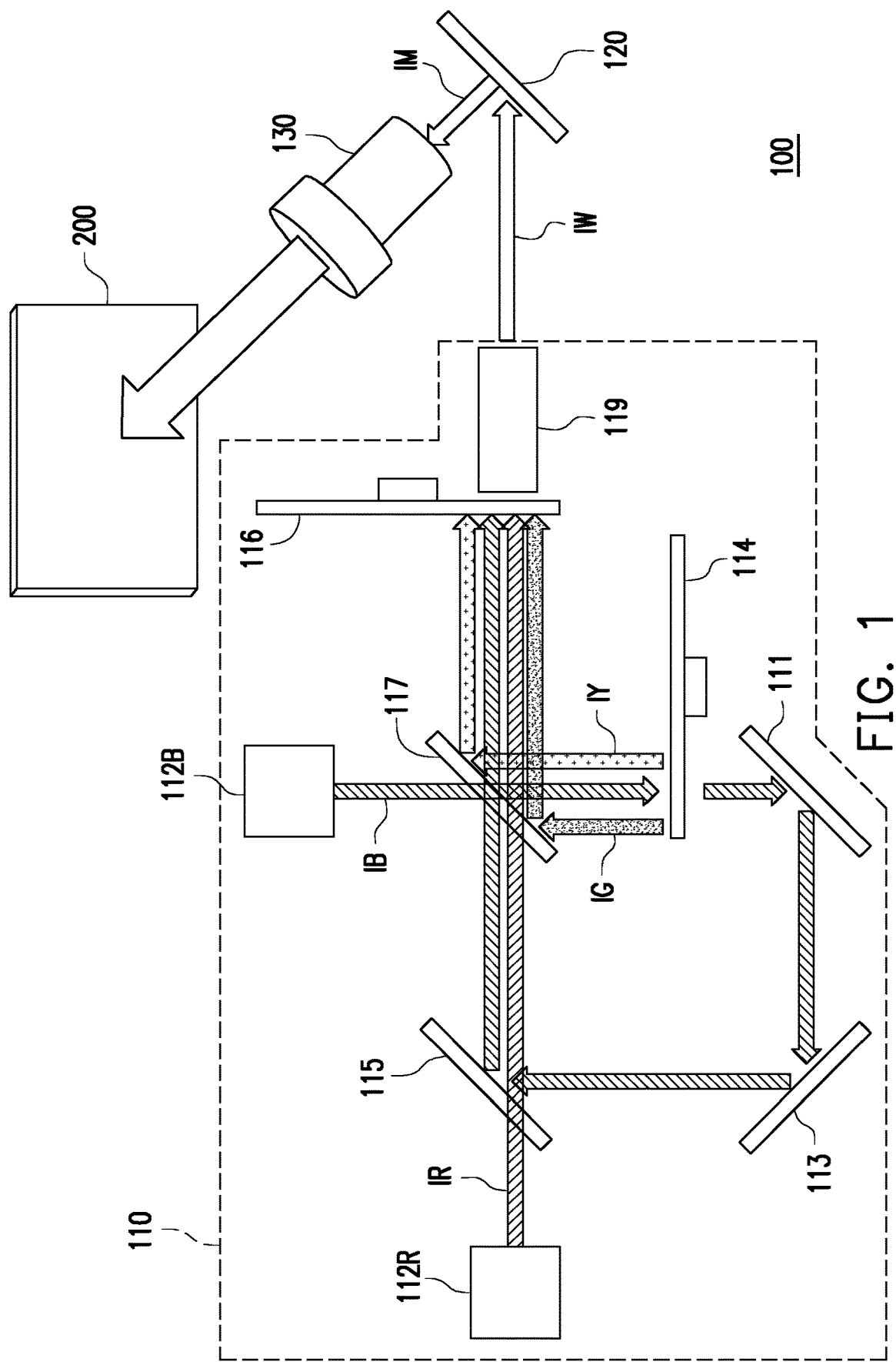
FIG. 1 is a schematic view illustrating a projection apparatus according to an embodiment of the invention.

FIG. 1 is a schematic view illustrating a projection apparatus according to an embodiment of the invention. Referring to FIG. 1, a projection apparatus 100 of the embodiment includes a light source module 110, an imaging element 120, and a projection lens 130. In the embodiment, the light source module 110 is configured to provide an illumination beam IW to the imaging element 120. The imaging element 120 is disposed on a transmission path of the illumination beam IW. The imaging element 120 is configured to convert the illumination beam IW into an image beam IM. The projection lens 130 is disposed on a transmission path of the image beam IM. The projection lens 130 is configured to project the image beam IM to a projection target 200, such as a screen, a surface, or other suitable projection targets.

In the embodiment, the imaging element 120 is, for example, a reflection type light modulator, such as a liquid crystal on silicon (LCoS) panel, a digital micro-mirror device (DMD). Alternatively, the imaging element 120 may also be a transmission type light modulator, such as a transparent liquid crystal panel, an electro-optical modulator, a magneto-optic modulator, an acousto-optic modulator (AOM). It should be noted that the invention does not intend to impose a limitation on the configurations and types of the imaging element 120. In the embodiment, people having ordinary skills in the art are already familiar with the methods, detailed processes, and practices as to the conversion of the illumination beam IW into the image beam IM by the imaging element 120. Thus, details in this respect will not be reiterated in the following.

In the embodiment, the projection lens 130 is a combination of one or more optical lenses having a refractive power, for example. As examples, the projection lens 130 may include a biconcave lens, a biconvex lens, a concave-convex lens, a convex-concave lens, a plane-convex lens, a meniscus lens, a plane-concave lens, or a combination thereof. In an embodiment, the projection lens 130 may also include a planar optical lens and project the image beam IM to the projection target 200 through reflection or transmission. It should be noted that the configurations and types of the projection lens 130 of the invention are not limited thereto.

In the embodiment, the light source module 110 includes a blue light source 112B, a red light source 112R, a wavelength conversion wheel 114, a filter wheel 116, a plurality of reflective elements 111 and 113, a plurality of light combining elements 115 and 117, and a light homogenizing element 119. As examples, the homogenizing element 119 may include an integration rod, a fly eye lens, or a combination of the optical elements, but the invention is not limited thereto. Specifically, in the embodiment, the blue light source 112B is configured to provide a blue light beam IB, the red light source 112R is configured to provide a red light beam IR, and the wavelength conversion wheel 114 is disposed on a transmission path of the blue light beam IB. The wavelength conversion wheel 114 is a phosphor wheel, for example. The wavelength conversion wheel 114 has at least one wavelength conversion region and a first region. The first region is for processing the blue light beam IB. The detail processing of the first region is described below. In this embodiment, the first region is a transparent region. The wavelength conversion region and the transparent region are rotated onto the transmission path of the blue light beam IB by turns The blue light beam IB is converted by the wavelength conversion region to generate a green light beam IG or a yellow light beam IY. The blue light beam IB passes through the transparent region. The filter wheel 116 is disposed on transmission paths of the blue light beam IB and the red light beam IR. The filter wheel 116 is a filter color wheel, for example. The filter wheel 116 has a filter region and a diffusion region. The filter region and the diffusion region are configured for light beams in different colors to pass through.

In the embodiment, the reflective elements 111 and 113 are disposed on the transmission path of the blue light beam IB, so as to adjust the transmission path of the blue light beam IB. The light combining element 115 is disposed on the transmission paths of the blue light beam IB and the red light beam IR to combine the blue light beam IB with the red light beam IR. The light combining element 117 is disposed on the transmission paths of the blue light beam IB, the red light beam IR, the green light beam IG, and the yellow light beam IY to integrate the blue light beam IB, the red light beam IR, the green light beam IG, and the yellow light beam IY. The light homogenizing element 119 are disposed on a light path between the filter 116 and the imaging element 120 to homogenize the light and thus allow the light beam passing through the light homogenizing element 119 to be uniformly output from the light source module 110, thereby avoiding inconsistent brightness of the projection apparatus 100 on the light path.

In the embodiment, a light source adopted in the light source module 110 is, for example, a laser diode (LD), a light emitting diode (LED), an organic light emitting diode (OLED), or any other light sources meeting a size requirement in the practical design. The invention does not intend to impose a limitation in this regard. In the embodiment, the light combining elements 115 and 117 are semi-transmissive lenses (also referred to as dichroic mirrors), for example, capable of deflecting reflected light transmitted to the lens toward another direction and allowing penetrating light transmitted to the lens to pass through. In the embodiment, the numbers and locations of the reflective elements 111 and 113, the light combining elements 115 and 117, and the integration rod 119 are merely described for an illustrative purpose and shall not be construed as limitations of the invention. The numbers and locations of the optical elements may be modified based on different optical frameworks of the light source module 110.

Figure 2:
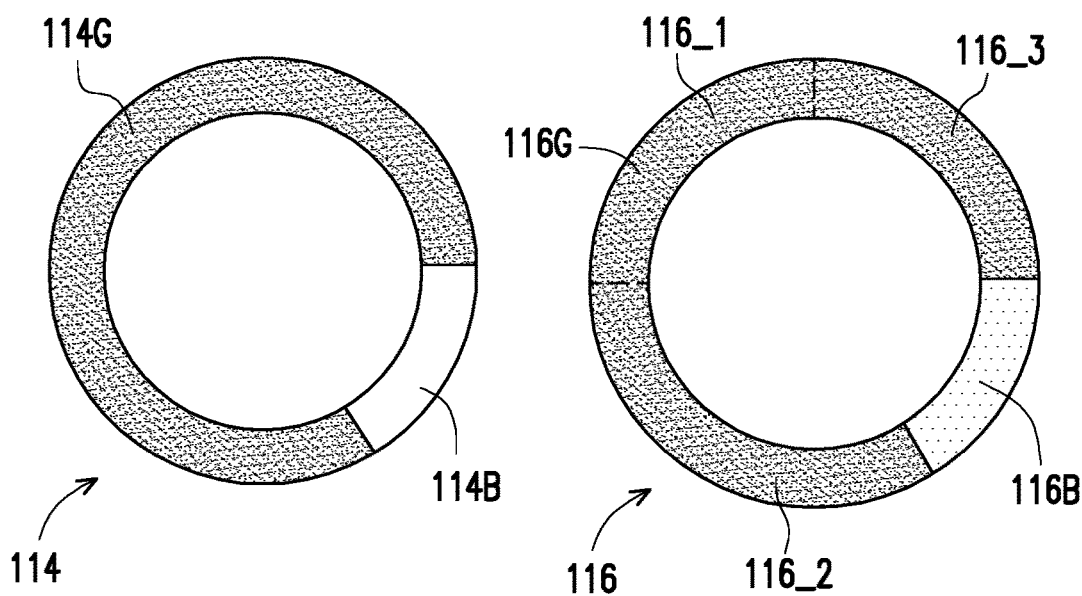
FIG. 2 is a schematic view illustrating a wavelength conversion wheel and a filter wheel according to an embodiment of the invention.

FIG. 2 is a schematic view illustrating a wavelength conversion wheel and a filter wheel according to another embodiment of the invention. Referring to FIGS. 1 and 2, in the embodiment, the wavelength conversion wheel 114 includes a first wavelength conversion region 114G and a transparent region 114B. The blue light beam IB is converted by the first wavelength conversion region 114G to generate the green light beam IG, and the blue light beam IB passes through the transparent region 114B. In the embodiment, the filter wheel 116 includes a first filter region 116G and a diffusion region 116B. The green light beam IG and the red light beam IR pass through the first filter region 116G, as shown in a filter spectrum illustrated in FIG. 3. The details of the filter spectrum will be described in the subsequent paragraphs. In addition, the first filter region 116G includes a first sub-region 116_1, a second sub-region 116_2, and a third sub-region 116_3. The blue light beam IB passes through the diffusion region 116B. In the embodiment, the wavelength conversion wheel 114 and the filter wheel 116 have the same rotation speed. The first wavelength conversion region 114G corresponds to the first filter region 116G. The transparent region 114B corresponds to the diffusion region 116B. Besides, in the embodiment, the wavelength conversion wheel 114 and the filter wheel 116 have the same rotation speed. The first wavelength conversion region 114G corresponds to the first filter region 116G, and the transparent region 114B corresponds to the diffusion region 116B.

Figure 3:
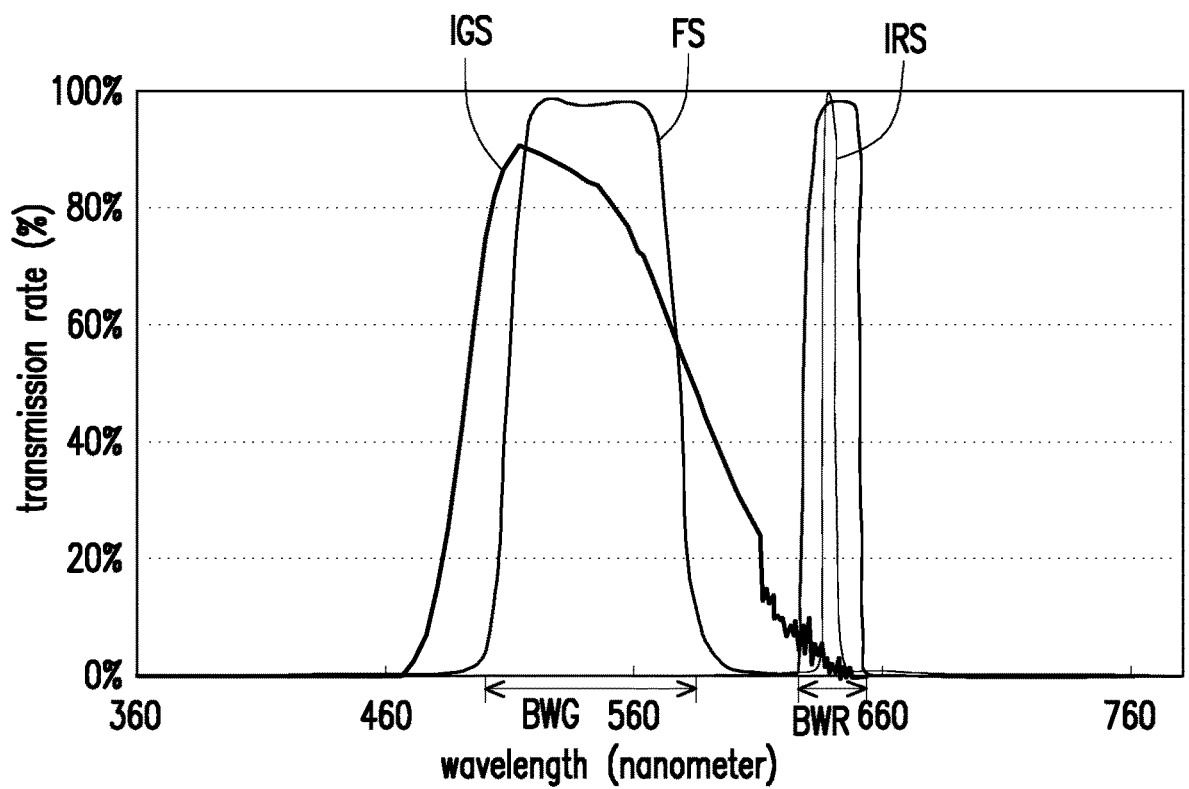
FIG. 3 is a view illustrating a filter spectrum of a first filter region of the filter wheel according to the embodiment shown in FIG. 2.

FIG. 3 is a view illustrating a filter spectrum of the first filter region 116G of the filter wheel according to the embodiment shown in FIG. 2. Referring to FIGS. 2 and 3, a filter spectrum FS of the first filter region 116G includes a first bandwidth BWG that allows the green light beam to pass through and a second bandwidth BWR that allows the red light beam to pass through. In addition, the first bandwidth BWG and the second bandwidth BWR are separated from each other. In FIG. 3, a spectral line IGS is an optical spectrum of the green light beam IG, for example, and a spectral line IRS is an optical spectrum of the red light beam IR, for example. Therefore, in the embodiment, the green light beam IG and the red light beam IR pass through the first filter region 116G. Besides, in the embodiment, people having ordinary skills in the art are familiar with fabrication of the filter spectrum FS simultaneously including the first bandwidth BWG and the second bandwidth BWR and the related techniques, so details in this respect will not be reiterated in the following.

Figure 4:
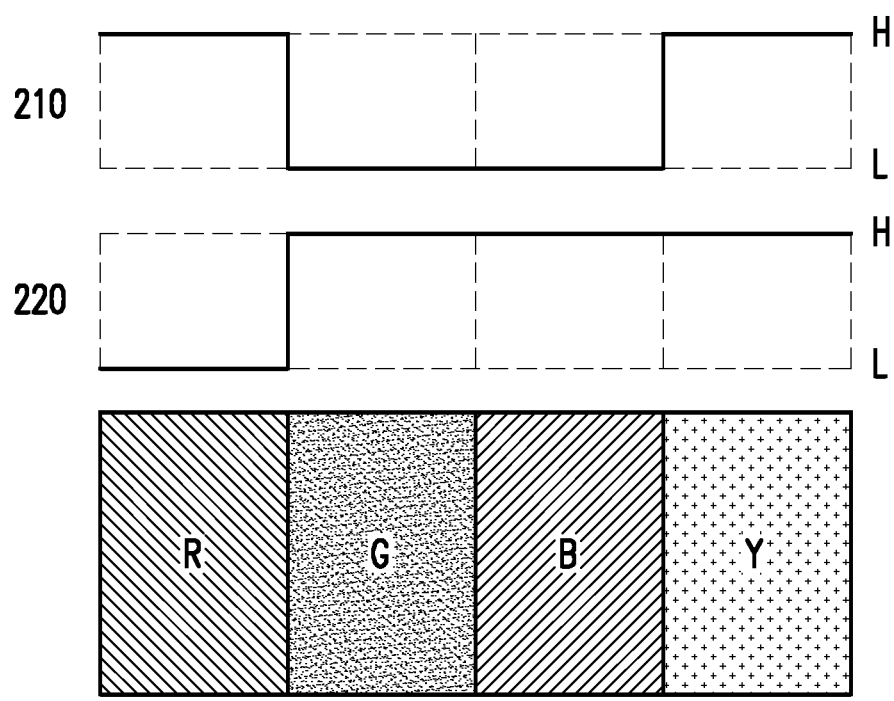
FIGS. 4, 5, and 6 are respectively schematic views illustrating a current driving a light source in different operation modes according to the embodiments shown in FIGS. 1 and 2.
Figure 5:
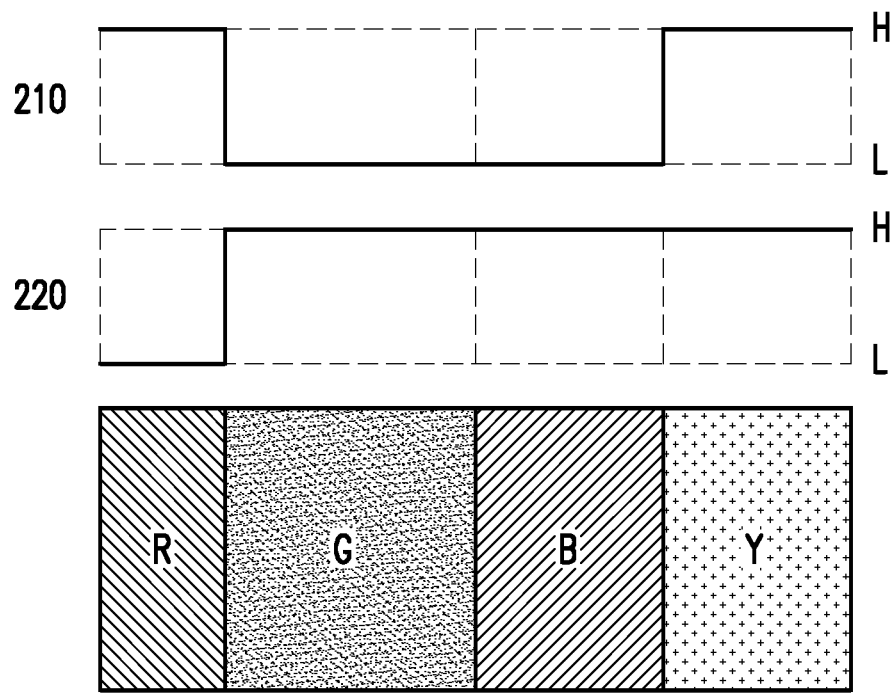
Figure 6:
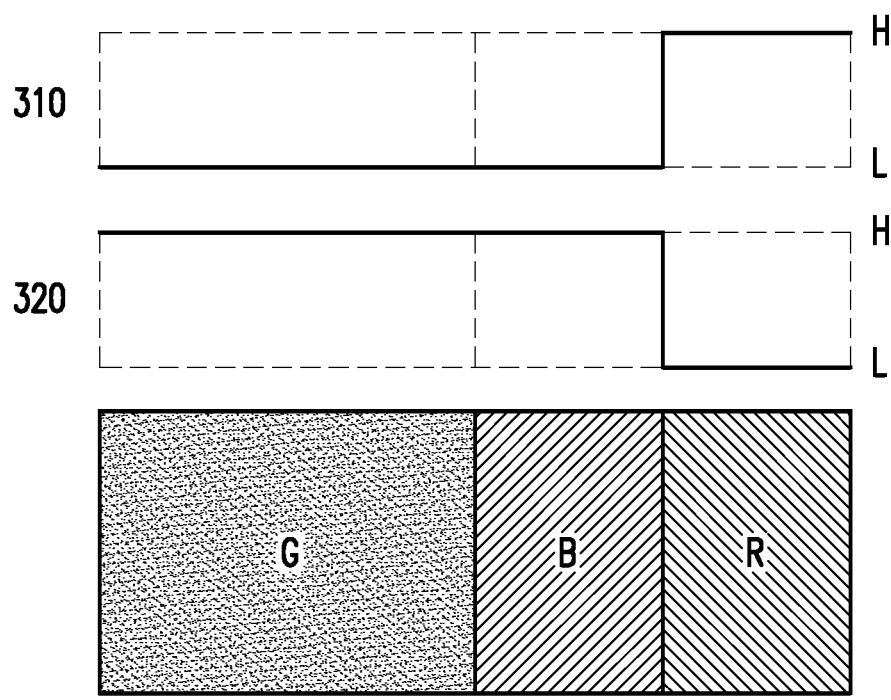

FIGS. 4, 5, and 6 are respectively schematic views illustrating a current driving a light source in different operation modes according to the embodiments shown in FIGS. 1 and 2. Referring to FIGS. 4, 5, and 6, respective blocks marked with R, G, B, and Y in FIGS. 4, 5, and 6 indicate that, in one round of rotation of the wavelength conversion wheel 114 and the filter wheel 116, light beams of corresponding colors are output by the filter wheel 116 in respective time intervals taken up by the respective blocks. For example, the block marked with R indicates that the filter wheel 116 outputs the red light beam IR during the interval, the block marked with G indicates that the filter wheel 116 outputs the green light beam IG during the interval, the block marked with B indicates that the filter wheel 116 outputs the blue light beam IB during the interval, and the block marked with Y indicates that the filter wheel 116 outputs the yellow light beam IY during the interval.

FIGS. 4, 5, and 6 are respectively schematic views illustrating a current driving a light source in different operation modes according to the embodiments shown in FIGS. 1 and 2. Referring to FIGS. 1, 2, and 4, in a first operation mode of FIG. 4, when the first sub-region 116_1 and the third sub-region 116_3 are rotated onto a transmission path of the red light beam IR, a current 210 for driving the red light source 112R is at a high level H. Thus, the red light source 112R is turned on to provide the red light beam IR. When the second sub-region 116_2, the diffusion region 116B, and the third sub-region 116_3 are rotated onto a transmission path of the blue light beam IB, a current 220 for driving the blue light source 112B is at the high level H, while a current 310 for driving the red light source 112R is at a low level L (i.e., turned off). Thus, the blue light source 112B is turned on to provide the blue light beam IB. In other words, in the first operation mode, the blue light source 112B is turned on during the intervals of the blocks G, B, and Y, and the red light source 112R is turned on during the intervals of the blocks R and Y and turned off during the intervals of the blocks G and B.

Then, referring to FIGS. 1, 2, and 5, levels of a second operation mode shown in FIG. 5 are similar to those of first operation mode, and the second operation mode mainly differs from the first operation mode in that the time periods when the red light source 112R and the blue light source 112B are turned on during the intervals of the blocks R and G are different. In the second operation mode, during the intervals of the blocks R and G, the time period when the red light source 112R is turned on is shorter than the time period when the blue light source 112B is turned on. Thus, in the second operation mode, the time periods when the red light source 112R and the blue light source 112B are turned on are adjustable to configure time durations for the filter wheel 116 to output light beams in different colors. For example, in the second operation mode, the time period for the filter wheel 116 to output the red light beam IR is shorter than the time period for the filter wheel 116 to output the blue light beam IB. Accordingly, fine-tuning of a location of a color point on a gamut mapping is enabled. In addition, fine-tuning of the time periods when the red light source 112R and the blue light source 112B are turned on during the blocks R and G in the second operation mode is taken as an example. However, the time periods when the red light source 112R and the blue light source 112B in other blocks are turned on may also be fine-tuned in the second operation mode. Thus, the invention is not limited to the example.

Referring to FIGS. 1 and 6 again, in a third operation mode of FIG. 6, when the third sub-region 116_3 is rotated onto the transmission path of the red light beam IR, the current 210 for driving the red light source 112R is at the high level H. Therefore, the red light source 112R is turned on to provide the red light beam IR. When the first sub-region 116_1, the second sub-region 116_2, and the diffusion region 116B are rotated onto the transmission path of the blue light beam IB, a current 120 for driving the blue light source 112B is at the high level H, and the current 210 for driving the red light source 112R is at the low level L.

Accordingly, the blue light source 112B is turned on to provide the blue light beam IB. In other words, in the third operation mode, the blue light source 112B is turned on during the intervals of the blocks G and B, and the red light source 112R is turned on during the interval of the block R. In addition, the third operation mode does not have the block Y. Therefore, in the third operation mode, the time periods when the red light source 112R and the blue light source 112B are turned on are adjustable to configure types of colored light beams output by the filter wheel 116. For example, in the third operation mode, the filter wheel 116 outputs the green light beam IG, the blue light beam IB, and the red light beam IR. Therefore, the green light beam IG, the blue light beam IB, and the red light beam IR output by the filter wheel 116 may result in purer white light after being mixed by the light homogenizing element 119.

Figure 7:
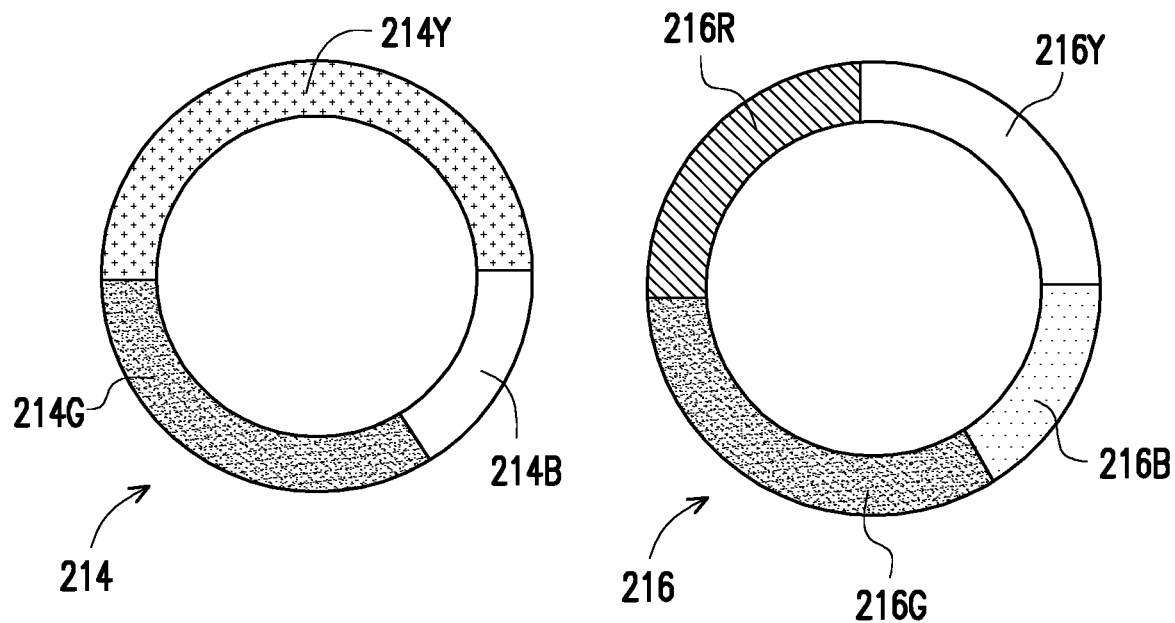
FIG. 7 is a schematic view illustrating a wavelength conversion wheel and a filter wheel according to another embodiment of the invention.

FIG. 7 is a schematic view illustrating a wavelength conversion wheel and a filter wheel according to another embodiment of the invention. Referring to FIGS. 1 and 7, a wavelength conversion wheel 214 and a filter wheel 216 of FIG. 7 serve as another embodiment of the wavelength conversion wheel 114 and the filter wheel 116 of the light source module 110 of FIG. 1. Like components and elements are described with like reference numerals, and details in this respect will not be repeated in the following.

In the embodiment, the wavelength conversion wheel 214 includes a first wavelength conversion region 214G, a second wavelength conversion region 214Y, and a transparent region 214B. The first wavelength conversion region 214G, the second wavelength conversion region 214Y, and the transparent region 214B are rotated onto the transmission path of the blue light beam IB by turns. The blue light beam IB is converted by the first wavelength conversion region 214G to generate the green light beam IG. The blue light beam IB is converted by the second wavelength conversion region 214Y to generate the yellow light beam IY. The blue light beam IB passes through the transparent region 214B. In the embodiment, the filter wheel 216 includes a first filter region 216G, a second filter region 216R, a third filter region 216Y, and a diffusion region 216B. The green light beam IG and the red light beam IR pass through the first filter region 216G. The red light beam IR passes through the second filter region 216R. The third filter region 216Y is a transparent glass region, for example, and the yellow light beam IY and light beams in other colors pass through the third filter region 216Y. The blue light beam IB passes through the diffusion region 216B.

Figure 8:
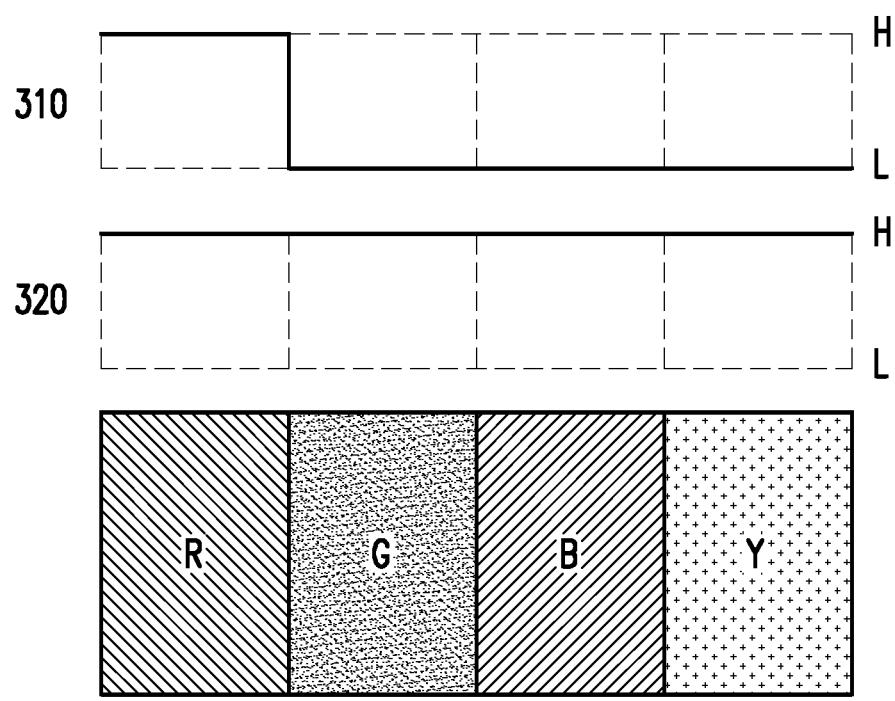
FIGS. 8, 9, and 10 are respectively schematic views illustrating a current driving a light source in different operation modes according to the embodiments shown in FIGS. 1 and 7.

Referring to FIGS. 1 and 8, in a fourth operation mode of FIG. 8, when the second filter region 216R is rotated onto the transmission path of the red light beam IR, the current 210 for driving the red light source 112R is at the high level H. Therefore, the red light source 112R is turned on to provide the red light beam IR. When the filter wheel 216 rotates, the current 320 for driving the blue light source 112B is also at the high level H. Therefore, the blue light source 112B is turned on to provide the blue light beam IB. The current 310 of the red light source 112R is switched to the low level L. In other words, in the fourth operation mode, the blue light source 112B is constantly turned on during the intervals of the blocks R, G, B, and Y, while the red light source 112R is turned on during the interval of the block R.

Figure 9:
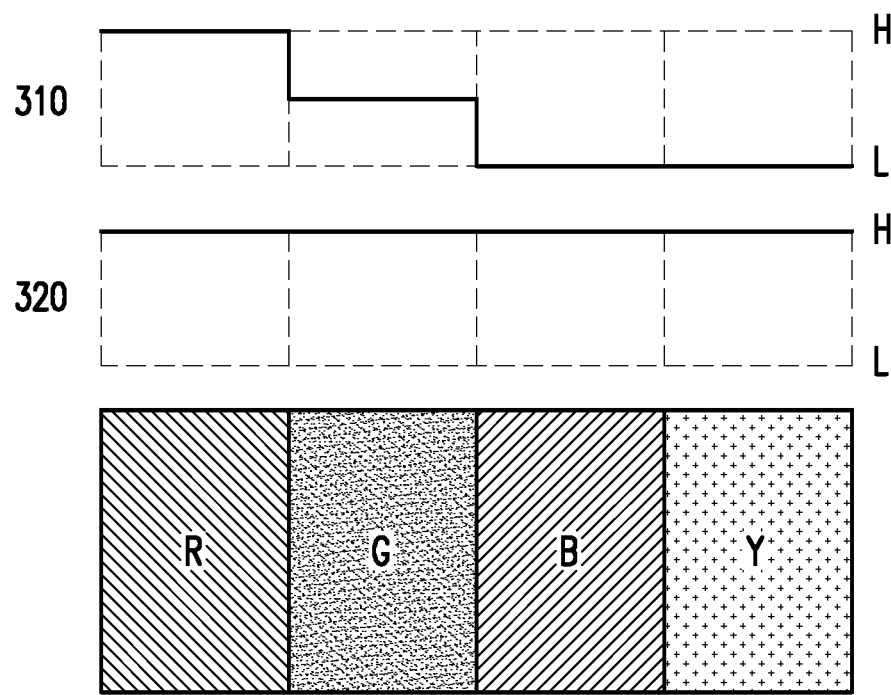

Then, referring to FIGS. 1 and 9, in a fifth operation mode of FIG. 9, when the second filter region 216R and the first filter region 216G are rotated onto the transmission path of the red light beam IR, the current 210 for driving the red light source 112R is at the high level H. Therefore, the red light source 112R is turned on to provide the red light beam IR. In the embodiment, the level of the current 310 during the interval of the block G is between the high level H during the interval of the block R and the low level L during the interval of the block B, indicating that a brightness of the red light beam IR is lower during the interval of the block G than during the interval of the block R. However, in an embodiment, the level of the current 310 during the interval of the block G may also be equal to the high level H during the interval of the block R. The invention does not intend to impose a limitation in this regard. When the filter wheel 216 rotates, the current 320 for driving the blue light source 112B is maintained at the high level H. Namely, the blue light source 112B is turned on to provide the blue light beam IB. In other words, in the fifth operation mode, the blue light source 112B is constantly turned on during the intervals of the blocks R, G, B, and Y, while the red light source 112R is turned on during the intervals of the blocks R and G.

In addition, in the fifth operation mode of FIG. 9, the red light source 112R is also turned on during the interval of the block G. The current of the red light source 112R may be suitably adjusted, such as being adjusted to be lower than or equal to the high level H during the interval of the block R. In the embodiment, since the red light beam IR passes through the first filter region 216R, as shown in the filter spectrum of FIG. 3, in a green color gamut of color gamut coordinates, the fifth operation mode of the light source module 110 of FIG. 9 is able to provide a different color gamut coordinate point on the color gamut coordinates, as compared with the fourth operation mode of FIG. 8. Besides, in the embodiment, the red light source 112R is also turned on during the interval of the block G. Therefore, an overall brightness of the light beam of the light source module 110 is also facilitated, thereby reducing an energy loss caused by the filter wheel 216. Compared with the fourth operation mode, the light source module 110 provides a broader color gamut in the fifth operation mode.

Figure 10:
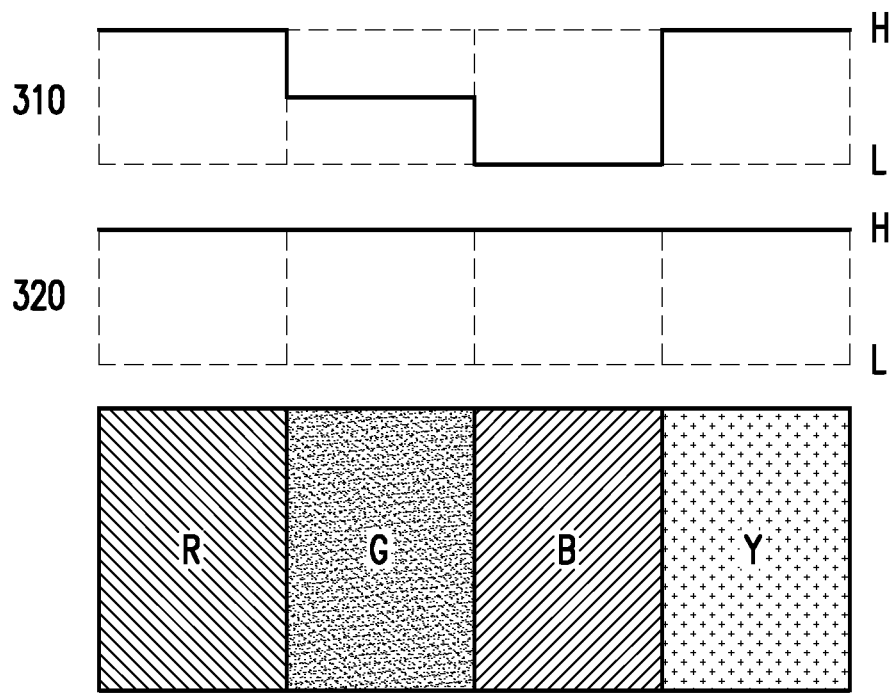

Referring to FIGS. 1 and 10, a sixth operation mode of FIG. 10 is similar to the fifth operation mode of FIG. 9. However, a difference lies in that, in the sixth operation mode, when the second filter region 216R, the first filter region 216G, and the third filter region 216Y are rotated onto the transmission path of the red light beam IR, the current 310 for driving the red light source 112R is located at the high level H (the current 310 for the red light source 112R during the interval of the block G may also be suitably adjusted as in the fifth operation mode), for example. Therefore, the red light source 112R is turned on to provide the red light beam IR. In the embodiment, the level of the current 310 during the interval of the block Y is also equal to the high level H. In other words, the brightness of the red light beam IR during the interval of the block Y is equal to the brightness of the red light beam IR during the interval of the block R. In an embodiment, the level of the current 310 during the interval of the block Y may also be lower than the high level H during the interval of the block R. The invention does not intend to impose a limitation in this regard. When the filter wheel 216 rotates, the current 320 for driving the blue light source 112B is at the high level H. Namely, the blue light source 112B is turned on to provide the blue light beam IB. In other words, in the sixth operation mode, the blue light source 112B is turned on during the intervals of the blocks R, G, B, and Y, while the red light source 112R is turned on during the intervals of the blocks R, G, and Y. In the sixth operation mode, the red light source 112R is not only turned on during the intervals of the blocks R and G, but is also turned on during the interval of the block Y. Therefore, the overall brightness of the light source module 110 is further facilitated.

Figure 11:
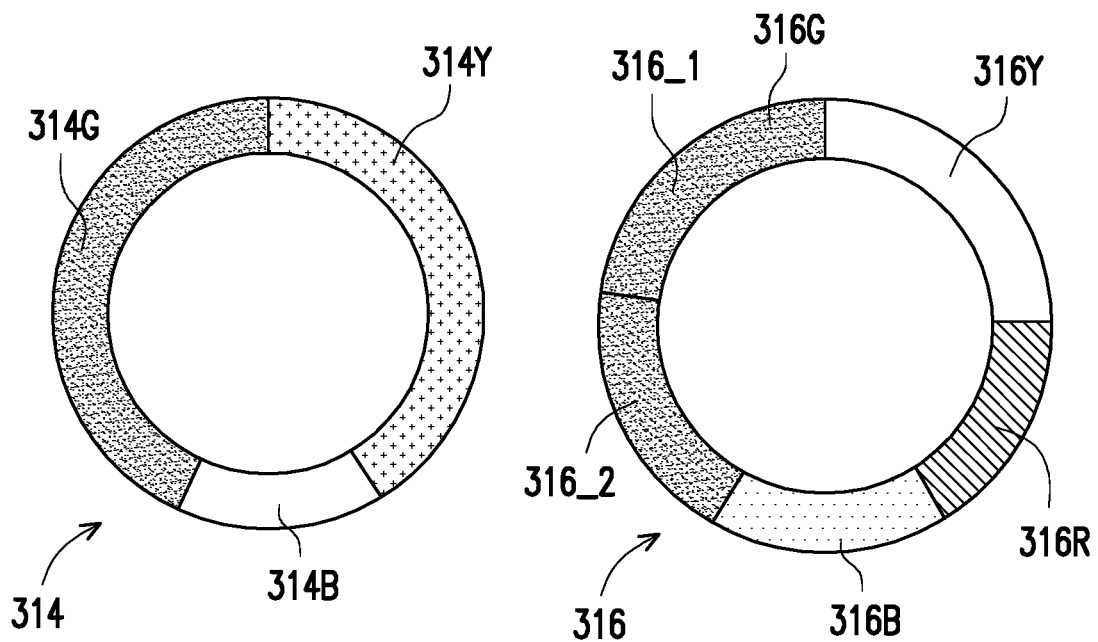
FIG. 11 is a schematic view illustrating a wavelength conversion wheel and a filter wheel according to another embodiment of the invention.

FIG. 11 is a schematic view illustrating a wavelength conversion wheel and a filter wheel according to another embodiment of the invention. Referring to FIGS. 1 and 11, a wavelength conversion wheel 314 and the filter wheel 316 of FIG. 11 serve as another embodiment of the wavelength conversion wheel 114 and the filter wheel 116 of the light source module 110 of FIG. 1. Like components and elements are described with like reference numerals, and details in this respect will not be repeated in the following.

In the embodiment, the wavelength conversion wheel 314 includes a first wavelength conversion region 314G, a second wavelength conversion region 314Y, and a transparent region 314B. The first wavelength conversion region 314G, the second wavelength conversion region 314Y, and the transparent region 314B are rotated onto the transmission path of the blue light beam IB by turns. The blue light beam IB is converted by the first wavelength conversion region 314G to generate the green light beam IG. The blue light beam IB is converted by the second wavelength conversion region 314Y to generate the yellow light beam IY. The blue light beam IB passes through the transparent region 314B. In the embodiment, the filter wheel 316 includes a first filter region 316G, a second filter region 316R, a third filter region 316Y, and a diffusion region 316B. The green light beam IG and the red light beam IR pass through the first filter region 316G, as shown in the filter spectrum illustrated in FIG. 3. The first filter region 316G includes a first sub-region 316_1 and a second sub-region 316_2. The red light beam IR passes through the second filter region 316R. The yellow light beam IY passes through the third filter region 316Y. The blue light beam IB passes through the diffusion region 316B. In the embodiment, the wavelength conversion wheel 314 and the filter wheel 316 have the same rotation speed. The first wavelength conversion region 314G corresponds to the first filter region 316G. The second wavelength conversion region 314Y corresponds to the second filter region 316R and the third filter region 316Y. The transparent region 414B corresponds to the diffusion region 416B.

Figure 12:
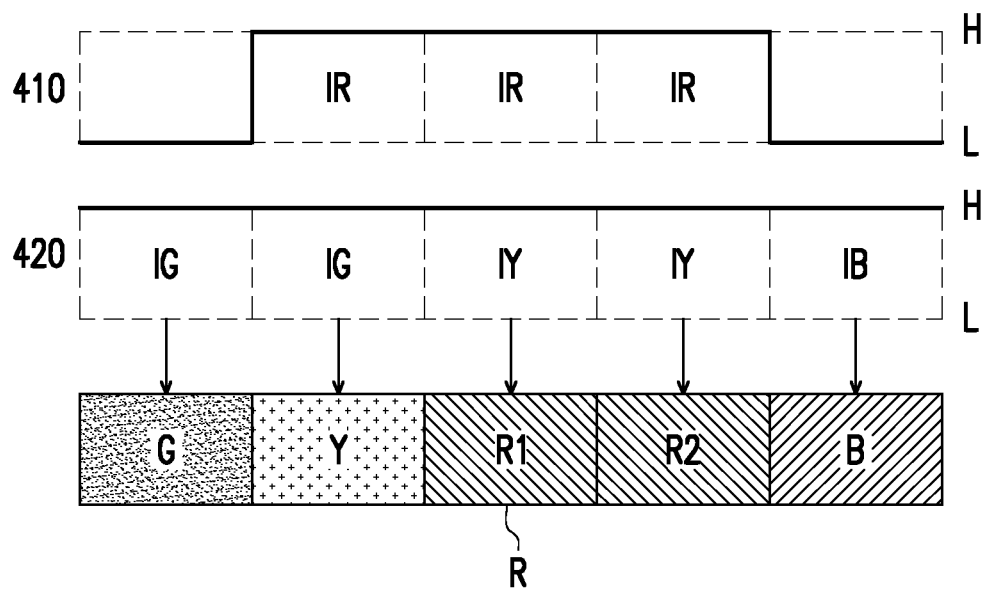
FIGS. 12 and 13 are respectively schematic views illustrating a current driving a light source in different operation modes according to the embodiments shown in FIGS. 1 and 11.
Figure 13:
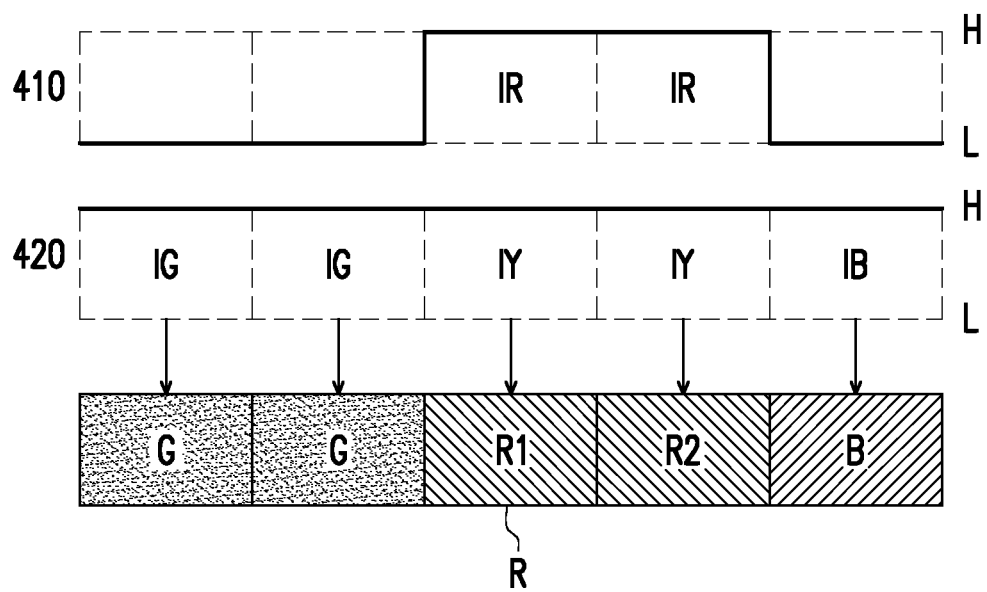

FIGS. 12 and 13 are respectively schematic views illustrating a current driving a light source in different operation modes according to the embodiments shown in FIGS. 1 and 11. Referring to FIGS. 1 and 12, in a seventh operation mode of FIG. 12, a symbol 410 marks a current for driving the red light source 112R, and a symbol 420 marks a current for driving the blue light source 112B. In the seventh operation mode, when the filter wheel 316 rotates, the current 420 for driving the blue light source 112B is at the high level H. The blue light source 112B is turned on to provide the blue light beam IB. The wavelength conversion wheel 414 sequentially outputs the green light beam IG, the yellow light beam IY, and the blue light beam IB. When the first sub-region 316_1, the third filter region 316_Y, and the second filter region 316_R are rotated onto the transmission path of the red light beam IR, the current 410 for driving the red light source 112R is at the high level H. Therefore, the red light source 112R may provide the red light beam IR. In other words, the blue light source is constantly turned on during the intervals of the blocks G, Y, R, and B. In addition, the block R further includes a first sub red block R1 and a second sub red block R2. In the seventh operation mode, the green light beam IG and the red light beam IR are mixed to form the block Y, the yellow light beam IY and the red light beam IR are mixed to form the first sub red block R1, and the red light beam IY and the red light beam IR are mixed to form the second sub red block R2. In addition, the first sub red block R1 and the second sub red block R2 are slightly different in color, so as to increase the color gamut of the light source module 110. In addition, since the red light source 112R is also turned on when the filter wheel 316 is rotated to the first sub-region 316_1, the brightness of the light source module 110 may be further facilitated.

Then, referring to FIGS. 1 and 13, in an eighth operation mode, when the filter wheel 316 rotates, the current 420 for driving the blue light source 112B is at the high level H. The blue light source 112B is turned on to provide the blue light beam IB. The wavelength conversion wheel 314 sequentially outputs the green light beam IG, the yellow light beam IY, and the blue light beam IB. When the third filter region 316_Y and the second filter region 316_R are rotated onto the transmission path of the red light beam IR, the current 410 for driving the red light source 112R is at the high level H. Therefore, the red light source 112R is turned on to provide the red light beam IR. In other words, the blue light source is constantly turned on during the intervals of the blocks G, Y, R, and B. In addition, the block R further includes a first sub red block R1 and a second sub red block R2. In the eighth operation mode, the yellow light beam IY and the red light beam IR are mixed to form the block R. In addition, the first sub red block R1 and the second sub red block R2 are slightly different in color, so as to increase the color gamut of the light source module. In addition, since the light source module 100 does not generate the yellow light beam in the eighth operation mode, a color purity of the illumination beam IW output by the light source module 100 is facilitated.

Figure 14:
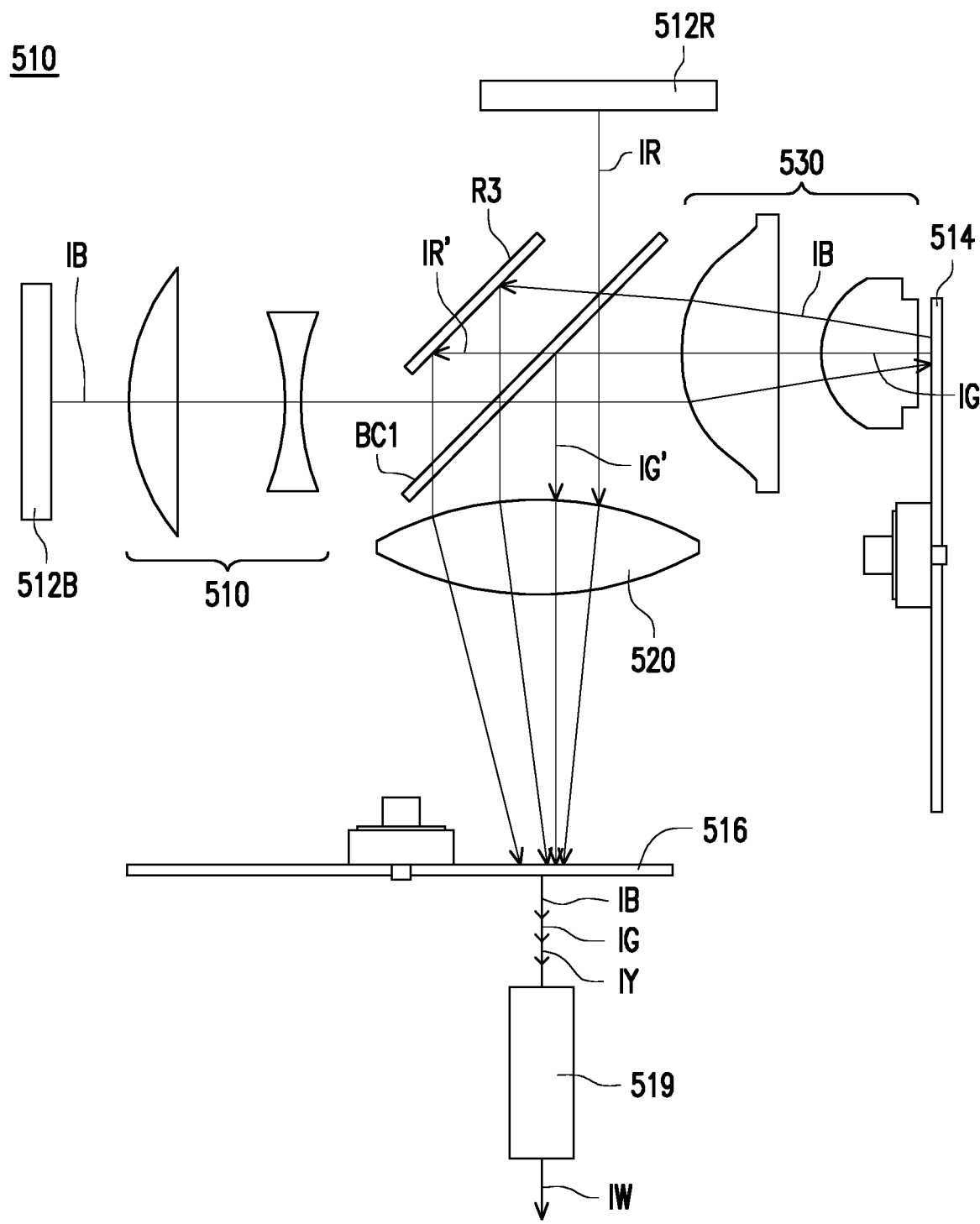
FIG. 14 is a schematic view illustrating a light source module according to another embodiment of the invention.

FIG. 14 is a schematic view illustrating a light source module according to another embodiment of the invention. Referring to FIG. 14, the light source module 510 of the embodiment is configured to provide an illumination beam IW. In the embodiment, the light source module 510 includes a blue light source 512B, a red light source 512R, a wavelength conversion wheel 514, a filter wheel 516, a first lens module 510, a second lens module 520 and a third lens module 530. The lens module may include at least one lens. The light source module 510 further includes the first light-combining device BC1 and a reflecting mirror R3.

Figure 15:
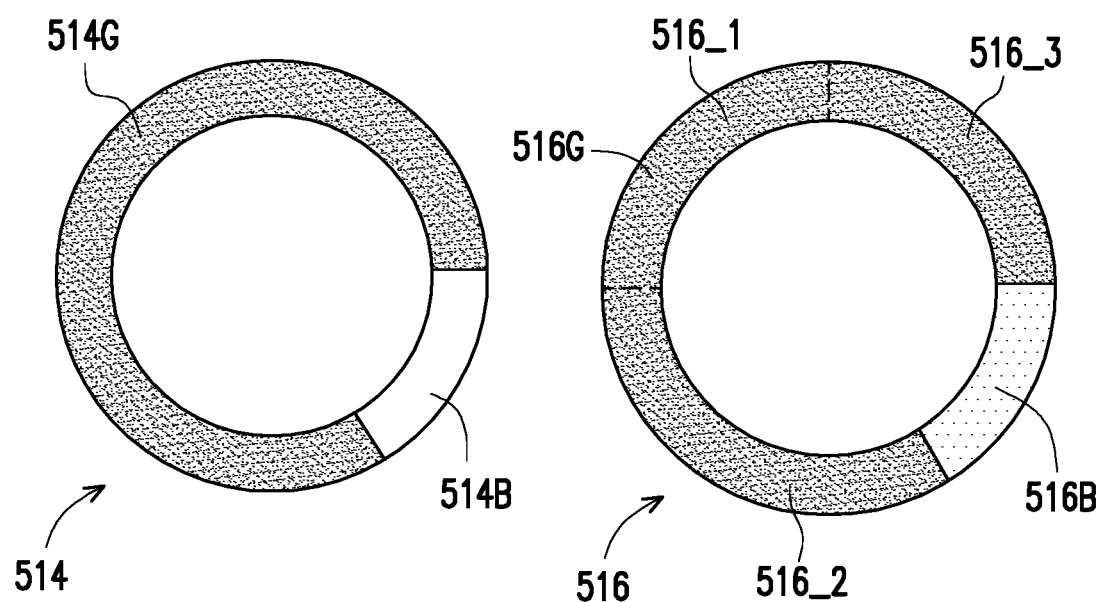
FIG. 15 is a schematic view illustrating a wavelength conversion wheel and a filter wheel according to another embodiment of the invention.

FIG. 15 is a schematic view illustrating a wavelength conversion wheel and a filter wheel according to another embodiment of the invention. Referring to FIG. 15, in the embodiment, the wavelength conversion wheel 514 includes a first wavelength conversion region 514G and a first region 514B. In this embodiment, the first region 514B is a reflection region. The blue light beam IB is converted by the first wavelength conversion region 514G to generate the green light beam IG, and the blue light beam IB is incident onto the reflection region and is reflected from the reflection region. In the embodiment, the filter wheel 516 includes a first filter region 516G and a diffusion region 516B. The green light beam and the red light beam pass through the first filter region 516G, as shown in a filter spectrum illustrated in FIG. 3. The blue light beam passes through the diffusion region 516B. The first filter region 516G may further include a first sub-region 516_1, a second sub-region 516_2, and a third sub-region 516_3, similar to the first sub-region 116_1, the second sub-region 116_2, and the third sub-region 116_3 described above. The first wavelength conversion region 514G corresponds to the first filter region 516G. The first region 514B corresponds to the diffusion region 516B.

Referring to FIGS. 14 and 15, the first light-combining device BC1 of the embodiment allows the blue light beam IB emitted from the blue light source 512B to pass through. When the blue light beam IB passing through the first light-combining device BC1 irradiates the first region 514B, the blue light beam IB reflected by the reflection region of the first region 514B transmits to the reflecting mirror R3 through the first light-combining device BC1. Next, the reflecting mirror R3 reflects the blue light beam IB to the filter wheel 516.

When the blue light beam IB passing through the first light-combining device BC1 irradiates the first wavelength conversion region 514G, the first wavelength conversion region 514G converts the blue light beam IB into a green light beam IG. In an embodiment, the green light beam IG has a first light wavelength spectrum range (the red sub light beam IR') and a second light wavelength spectrum range (the green sub light beam IG'). The first light wavelength spectrum range is at least partially overlapped with the light wavelength spectrum range of the red light beam IR from the red light source 512R. The first light-combining device BC1 reflects the green sub light beam IG' and allows the red sub light beam IR' and the red light beam IR to pass through. The reflecting mirror R3 reflects the red sub light beam IR' back to the first light-combining device BC1, such that the red sub light beam IR' passes the first light-combining device BC1 and transmits to the lens set 120. The filter wheel 516 is adapted to filter the green light beam and the red light beam to generate a yellow light beam IY.

The light source module 510 of the embodiment may further include a light uniform device 519 disposed on the transmission paths of the blue light beam IB, the yellow light beam IY and the green light beam IG from the filter wheel 516. Additionally, the light transmission path of the blue light beam IB incident onto the reflection region and reflected from the reflection region is described detail in patent application Ser. No. 15/863,999, filed Jan. 8, 2018 for reference.

In view of the above, the embodiments of the invention have at least the following advantages effects. In the exemplary embodiments of the invention, the light source module includes the blue light source, the red light source, the wavelength conversion wheel, and the filter wheel. In addition, the filter spectrum of the first filter region of the filter wheel includes the first bandwidth for the green light beam to pass through and the second bandwidth for the red light beam to pass through. Based on different combinations of the wavelength conversion wheel and the filter wheel, the light source module drives the blue light source and the red light source with different types of currents. Therefore, the light source module and the projection apparatus with the light source module have a broader color gamut, higher brightness and less loss of energy.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. These claims may refer to use "first", "second", etc. following with noun or element. Such terms should be understood as a nomenclature and should not be construed as giving the limitation on the number of the elements modified by such nomenclature unless specific number has been given. Moreover, no element and component in the present disclosure is intended to be dedicated to the public regardless of whether the element or component is explicitly recited in the following claims.

What is claimed is:

1. A light source module, configured to provide an illumination beam, comprising: a blue light source, a red light source, a wavelength conversion wheel, and a filter wheel, wherein the blue light source is configured to provide a blue light beam, the red light source is configured to provide a red light beam, the wavelength conversion wheel is disposed on a transmission path of the blue light beam and not disposed on a transmission path of the red light beam, the wavelength conversion wheel has a first wavelength conversion region, wherein the first wavelength conversion region is rotatable to cut into the transmission path of the blue light beam, and the blue light beam is converted by the wavelength conversion region to generate a green light beam, and the filter wheel is disposed on transmission paths of the blue light beam and the red light beam and comprises a first filter region and a diffusion region, wherein a filter spectrum of the first filter region comprises a first bandwidth allowing the green light beam to pass through and a second bandwidth allowing the red light beam to pass through, the first bandwidth and the second bandwidth are separated from each other, and the blue light beam passes through the diffusion region.

2. The light source module as claimed in claim 1, wherein the wavelength conversion wheel further comprises a first region for processing the blue light beam.

3. The light source module as claimed in claim 2, wherein the first region of the wavelength conversion wheel comprises a transparent region, the first wavelength conversion region and the first region are rotatable to cut into the transmission path of the blue light beam by turns, and the blue light beam is configured to pass through the first region when the first region is on the transmission path of the blue light beam.

4. The light source module as claimed in claim 2, wherein the first region of the wavelength conversion wheel comprises a reflection region, the first wavelength conversion region and the first region are rotatable to cut into the transmission path of the blue light beam by turns, and the reflection region is adapted to reflect the blue light beam when the blue light beam is incident to the reflection region.

5. The light source module as claimed in claim 2, wherein the wavelength conversion wheel and the filter wheel are rotatable to have the same rotation speed, and the first wavelength conversion region is corresponding to the first filter region, and the first region is corresponding to the diffusion region.

6. The light source module as claimed in claim 2, wherein the first filter region comprises a first sub-region, a second sub-region, and a third sub-region, and the red light source is configured to provide the red light beam when the first sub-region and the third sub-region of the first filter region are rotated onto the transmission path of the red light beam.

7. The light source module as claimed in claim 6, wherein the blue light source is configured to provide the blue light beam when the second sub-region and the third sub-region of the first filter region and the diffusion region are rotated onto the transmission path of the blue light beam by turns.

8. The light source module as claimed in claim 1, wherein the first filter region comprises a first sub-region, a second sub-region and a third sub-region, and the red light source is configured to provide the red light beam when the third sub-region of the first filter region is rotated onto the transmission path of the red light beam.

9. The light source module as claimed in claim 8, wherein the blue light source is configured to provide the blue light beam when the first sub-region and the second sub-region of the first filter region and the diffusion region are rotated onto the transmission path of the blue light beam.

10. The light source module as claimed in claim 5, wherein the wavelength conversion wheel further comprises a second wavelength conversion region, and the blue light beam is converted by the second wavelength conversion region to generate a yellow light beam when the second wavelength conversion region is rotated onto the transmission path of the blue light beam.

11. The light source module as claimed in claim 10, wherein the filter wheel further comprises a second filter region and a third filter region, the red light beam passes through the second filter region, the yellow light beam passes through the third filter region, and the second wavelength conversion region of the wavelength conversion wheel corresponds to the second filter region and the third filter region of the filter wheel.

12. The light source module as claimed in claim 10, wherein the first filter region comprises a first sub-region and a second sub-region, and the red light source is configured to provide the red light beam when the first sub-region of the first filter region, the third filter region, and the second filter region are rotated onto the transmission path of the red light beam.

13. The light source module as claimed in claim 10, wherein the red light source is configured to provide the red light beam when the third filter region and the second filter region are rotated onto the transmission path of the red light beam.

14. The light source module as claimed in claim 10, wherein the red light source is configured to provide the red light beam when the second filter region is rotated onto the transmission path of the red light beam.

15. The light source module as claimed in claim 10, wherein the red light source is configured to provide the red light beam when the second filter region and the first filter region are rotated onto the transmission path of the red light beam.

16. The light source module as claimed in claim 10, wherein the red light source is configured to provide the red light beam when the second filter region, the first filter region and the third filter region are rotated onto the transmission path of the red light beam.

17. The light source module as claimed in claim 10, wherein the blue light source is configured to provide the blue light beam when the filter wheel rotates.

18. A projection apparatus, comprising a light source module, an imaging element, and a projection lens, wherein
the light source is configured to provide an illumination beam, and the light source module comprises:
a blue light source, configured to provide a blue light beam;
a red light source, configured to provide a red light beam;
a wavelength conversion wheel, disposed on a transmission path of the blue light beam and having a first wavelength conversion region, wherein the first wavelength conversion region is rotatable to cut into the transmission path of the blue light beam, and the blue light beam is converted by the first wavelength conversion region to generate a green light beam; and
a filter wheel, disposed on transmission paths of the blue light beam and the red light beam and comprising a first filter region and a diffusion region,
wherein a filter spectrum of the first filter region comprises a first bandwidth allowing the green light beam to pass through and a second bandwidth allowing the red light beam to pass through, the first bandwidth and the second bandwidth are separated from each other, and the light source module provides an illumination beam based on the blue light source, the red light source, the wavelength conversion wheel, and the filter wheel; and wherein the light source module is configured to have at least one mode, the blue light source is turned on to provide the blue light beam so as to generate the green light beam by the first wavelength conversion region during the at least one mode and the red light source is turned on to provide the red light beam during the at least one mode, and the first filter region is configured so that the green light beam and the red light beam passes through the first filter region at the same time during the at least one mode;
the imaging element is disposed on a transmission path of the illumination beam and configured to convert the illumination beam into an image beam; and
the projection lens is disposed on the transmission path of the image beam and configured to project the image beam to a projection target.

19. The light source module as claimed in claim 18, wherein the wavelength conversion wheel further comprises a first region for processing the blue light beam.

20. The projection apparatus as claimed in claim 19, wherein the wavelength conversion wheel and the filter wheel have the same rotation speed, the first wavelength conversion region corresponds to the first filter region, and the first region corresponds to the diffusion region.

21. A light source module, configured to provide an illumination beam, comprising: a blue light source, a red light source, a wavelength conversion wheel, and a filter wheel, wherein
the blue light source is configured to provide a blue light beam,
the red light source is configured to provide a red light beam,
the wavelength conversion wheel is disposed on a transmission path of the blue light beam and not disposed on a transmission path of the red light beam, the wavelength conversion wheel has a first wavelength conversion region, wherein the first wavelength conversion region is rotatable to cut into the transmission path of the blue light beam, and the blue light beam is converted by the wavelength conversion region to generate a green light beam, and the filter wheel is disposed on transmission paths of the blue light beam and the red light beam and comprises a first filter region and a diffusion region, wherein a filter spectrum of the first filter region covers a first bandwidth and a second bandwidth, the first bandwidth and the second bandwidth are separated from each other, the first filter region is configured so that the green light beam passes through the filter region when the first filter region is at the path of the green light beam and the red light beam passes through the first filter region when the first filter region is at the path of the red light beam, and the blue light beam passes through the diffusion region, and wherein the filter wheel is configured to output the red light beam when the red light source is turned on and the blue light source is turned off.

22. A projection apparatus, comprising a light source module, an imaging element, and a projection lens, wherein the light source is configured to provide an illumination beam, and the light source module comprises:

a blue light source, configured to provide a blue light beam;

a red light source, configured to provide a red light beam;

a wavelength conversion wheel, disposed on a transmission path of the blue light beam and being not disposed on a transmission path of the red light beam, the wavelength conversion wheel having a first wavelength conversion region, wherein the first wavelength conversion region is rotatable to cut into the transmission path of the blue light beam, and the blue light beam is converted by the first wavelength conversion region to generate a green light beam; and a filter wheel, disposed on transmission paths of the blue light beam and the red light beam and comprising a first filter region and a diffusion region, wherein a filter spectrum of the first filter region covers a first bandwidth and a second bandwidth, the first bandwidth and the second bandwidth are separated from each other, the first filter region is configured so that the green light beam passes through the filter region when the first filter region is at the path of the green light beam and the red light beam passes through the first filter region when the first filter region is at the path of the red light beam, and the light source module provides an illumination beam based on the blue light source, the red light source, the wavelength conversion wheel, and the filter wheel, and wherein the filter wheel is configured to output the red light beam when the red light source is turned on and the blue light source is turned off;

the imaging element is disposed on a transmission path of the illumination beam and configured to convert the illumination beam into an image beam; and the projection lens is disposed on the transmission path of the image beam and configured to project the image beam to a projection target.

* * * * *